(12) United States Patent
Murase et al.

(10) Patent No.: US 9,430,096 B2
(45) Date of Patent: Aug. 30, 2016

(54) INTERACTIVE PROJECTOR

(71) Applicant: FUJITSU LIMITED, Kawasaki-shi, Kanagawa (JP)

(72) Inventors: Taichi Murase, Kawasaki (JP); Takahiro Matsuda, Isehara (JP); Kazuki Osamura, Kawasaki (JP); Masafumi Tada, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 262 days.

(21) Appl. No.: 14/187,555

(22) Filed: Feb. 24, 2014

(65) Prior Publication Data
US 2014/0292647 A1 Oct. 2, 2014

(30) Foreign Application Priority Data

Apr. 2, 2013 (JP) ................................ 2013-077046

(51) Int. Cl.
| | |
|---|---|
| *G03B 21/14* | (2006.01) |
| *G03B 21/28* | (2006.01) |
| *H04N 9/31* | (2006.01) |
| *G06F 3/042* | (2006.01) |
| *G03B 17/54* | (2006.01) |
| *G06F 3/01* | (2006.01) |

(52) U.S. Cl.
CPC ............. *G06F 3/0425* (2013.01); *G03B 17/54* (2013.01); *G03B 21/145* (2013.01); *G03B 21/28* (2013.01); *G06F 3/017* (2013.01); *H04N 9/3141* (2013.01)

(58) Field of Classification Search
CPC .... G03B 21/145; G03B 21/14; G03B 21/10; G03B 21/28; G03B 21/30; H04N 9/3141; H04N 9/3194

USPC .......................................................... 353/119
See application file for complete search history.

(56) References Cited

U.S. PATENT DOCUMENTS

| | | | | |
|---|---|---|---|---|
| 2,053,073 | A | * 9/1936 | Gardner | ................. G03B 21/00 352/90 |
| 9,105,211 | B2 | * 8/2015 | Keh | ....................... G06F 3/1454 |

(Continued)

FOREIGN PATENT DOCUMENTS

| | | |
|---|---|---|
| EP | 0840200 A2 | 5/1998 |
| EP | 2237563 A2 | 10/2010 |

(Continued)

OTHER PUBLICATIONS

Extended European Search Report dated Aug. 20, 2014 in corresponding European Patent Application No. 14156959.0.

(Continued)

*Primary Examiner* — William C Dowling
*Assistant Examiner* — Ryan Howard
(74) *Attorney, Agent, or Firm* — Staas & Halsey LLP

(57) ABSTRACT

An interactive projector includes: a base placed on a projection surface; a leg configured to raise with tilting from the base towards the projection surface; a projecting unit, mounted on the leg on the side of a projection surface, configured to project first image; a reflector, provided at a free-end portion of the leg, configured to reflect the image projected from the projecting unit towards the projection surface; and an image pickup unit, mounted on the reflector, configured to photograph the projection surface and output second image to an electronic device that outputs, to the projecting unit, the first image that is generated based on the second image.

19 Claims, 14 Drawing Sheets

(56) References Cited

U.S. PATENT DOCUMENTS

| | | |
|---|---|---|
| 2002/0105623 A1 | 8/2002 | Pinhanez |
| 2003/0007135 A1 | 1/2003 | Sciammarella et al. |
| 2010/0253618 A1 | 10/2010 | Nishigaki et al. |
| 2010/0315413 A1 | 12/2010 | Izadi et al. |
| 2010/0321646 A1* | 12/2010 | Nakano .................. G03B 21/14 353/119 |
| 2013/0127716 A1 | 5/2013 | Nagashima |

FOREIGN PATENT DOCUMENTS

| | | |
|---|---|---|
| JP | 2010-243576 | 10/2010 |
| JP | 2012-32465 | 2/2012 |
| WO | 2013/019217 A1 | 2/2013 |

OTHER PUBLICATIONS

Chris Harrison et al. "OmniTouch: Wearable Multitouch Interaction Everywhere", UIST'11 Proceedings of the 24th annual ACM symposium on User interface software and technology, pp. 441-450, Oct. 16-19, 2011.

* cited by examiner

INTERACTIVE PROJECTOR

CROSS-REFERENCE TO RELATED APPLICATION

This application is based upon and claims the benefit of priority of the prior Japanese Patent Application No. 2013-077046, filed on Apr. 2, 2013, the entire contents of which are incorporated herein by reference.

FIELD

The embodiments discussed herein are related to an interactive projector.

BACKGROUND

Electronic devices in which new user interfaces are mounted include, for example, game machines and computers that allow input operations using the hands, feet, or the body (called gesture operations). When input operations are performed by gesture operations, a mouse and a keyboard used in input operations are not used. Since the electronic devices are directly operated with the user's hands or fingers, operability is increased.

When projectors (projecting units) are used as display devices, not only are displays not used, but also information is directly projected onto an object.

Related technologies are disclosed in Japanese Laid-open Patent Publication Nos. 2010-243576 and 2012-32465 and "Omni Touch: Wearable Multitouch Interaction Everywhere" (Non Patent Literature 1).

SUMMARY

According to an aspect of the embodiments, an interactive projector includes: a base placed on a projection surface; a leg configured to raise with tilting from the base towards the projection surface; a projecting unit, mounted on the leg on the side of a projection surface, configured to project first image; a reflector, provided at a free-end portion of the leg, configured to reflect the image projected from the projecting unit towards the projection surface; and an image pickup unit, mounted on the reflector, configured to photograph the projection surface and output second image to an electronic device that outputs, to the projecting unit, the first image that is generated based on the second image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The same image from a projector provided on a desk is projected onto the desk in front of the projector and onto a wall surface (or screen) behind the projector. When, in an image display device, an operator performs an operation on the screen of the desk using an object, a projected image is capable of being changed. In this device, the position of the object on the screen of the desk is read by a single photodetector provided at the projector, and relative movement between two detection positions of the object is detected, as a result of which an icon operation on a projection screen, switching between projection screens, or changing of an image size is performed.

When a single photodetector is used, the movement of an image in a height direction may be difficult to detect. For example, two photodetectors are disposed side by side in a vertical direction with respect to the projection screen, and the height of an object from the screen of the desk is detected.

When a detection object is detected based on light reflected by the detection object, the coordinates and the height of an image of the detection object in a horizontal plane are detected. However, the precise shape and minute movements of the detection object may not be detected.

For example, in an interactive projector that is coupled to an electronic device having an interactive computation control function, a camera photographs an operation that is carried out by the hands, the legs, or the body on an image projected onto a projection surface by the projector. By determination of this operation, an image precisely corresponding to the operation may be projected onto the projection surface from the projector.

Figure 1A:
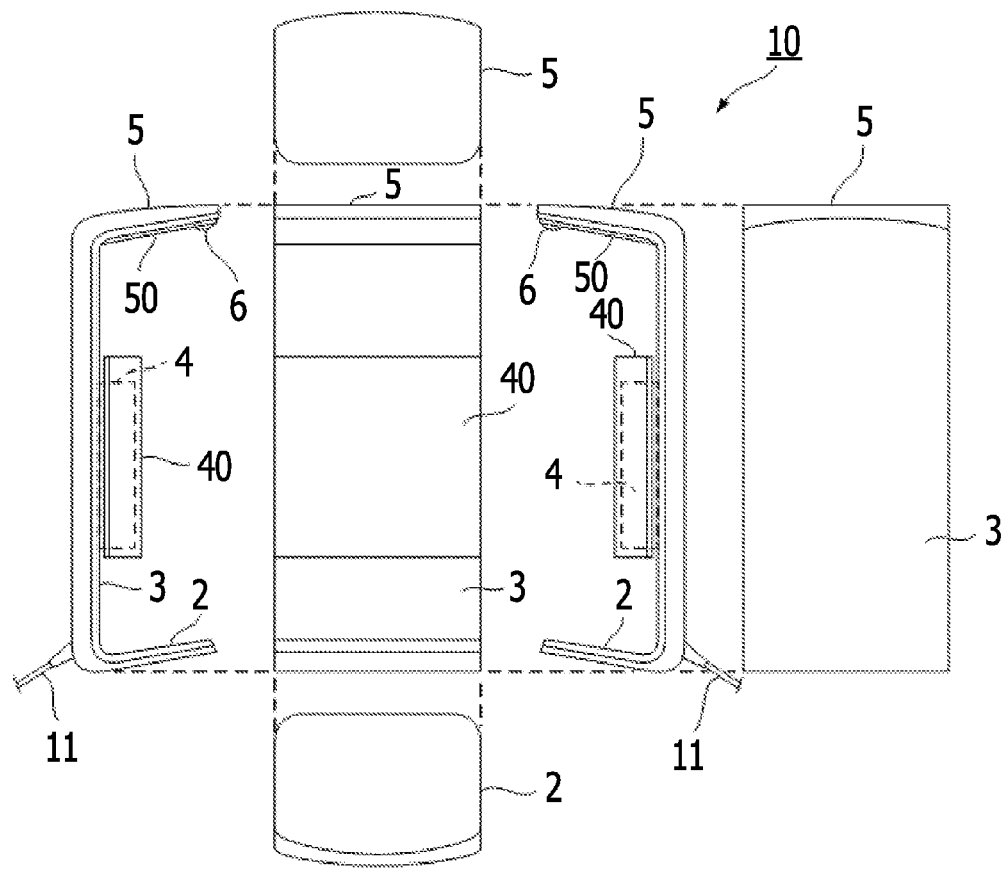
FIG. 1A illustrates an example of a structure of an interactive projector.
Figure 1B:
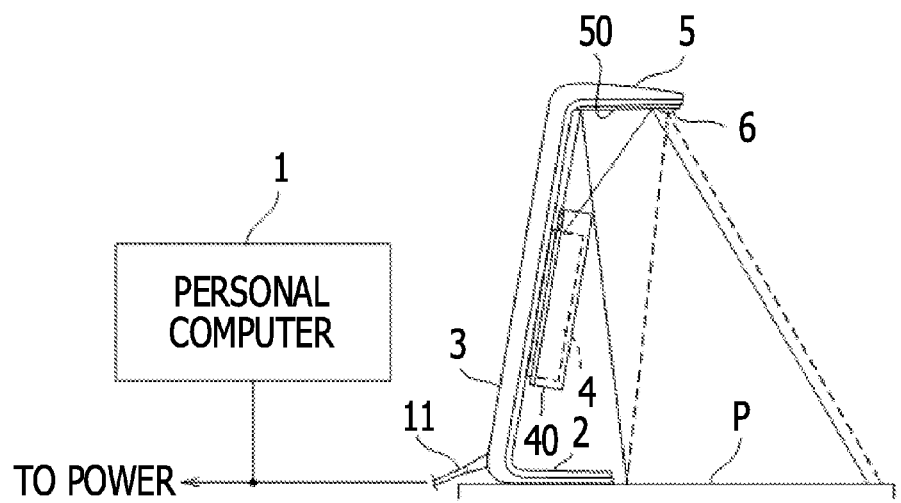
FIG. 1B illustrates an example of an operation of an interactive projector.

FIG. 1A illustrates an example of a structure of an interactive projector 10. FIG. 1A is a six side view of the interactive projector 10. FIG. 1B illustrates an example of an operation of an interactive projector. The interactive projector illustrated in FIG. 1B may be the interactive projector 10 illustrated in FIG. 1A. The interactive projector 10 may be used by coupling it to an electronic device having an interactive computation control function, such as a personal computer 1, using an input-output cord 11. The input-output cord 11 may also serve as a power supply cord. Power may be supplied to the interactive projector 10 from the input-output cord 11.

As illustrated in FIG. 1A, the interactive projector 10 includes a base 2, a leg 3 that is coupled to the base 2, a projecting unit 4 that is mounted on the leg 3, a reflector 5 that is provided at a free end portion of the leg 3, and an image pickup unit 6 that is provided at the reflector 5. For example, the angle between the base 2 and the leg 3 may be an acute angle, the angle between the leg 3 and the reflector 5 may be an obtuse angle, and a setting surface of the base 2 and a reflecting surface of the reflector 5 may be substantially parallel to each other. When the base 2 is placed horizontally, as illustrated in FIG. 1B, the leg 3 is raised from the base 2 by being tilted towards a projection surface P.

The projecting unit 4 is mounted on a projection surface-P side of the tilted leg 3, and is coupled to the personal computer 1 and a power supply by the input-output cord 11. A cover 40 that improves the design of the interactive projector 10 by hiding the projecting unit 4 is mounted on a front surface of the projecting unit 4. The projecting unit 4 projects an image transmitted from the personal computer 1 towards the reflector 5. The reflector 5 is provided with a mirror 50 that reflects the image projected from the projecting unit 4 towards the projection surface P. The image pickup unit 6 is provided at an end of the reflector 5. The image pickup image unit 6 may be, for example, a camera (hereunder referred to as the "camera 6"). The camera 6 photographs the image reflected by the mirror 50 and displayed on the projection surface P. The reflector 5 and the projecting unit 4 are assembled so that the projection surface P does not overlap the base 2. The image photographed by the camera 6 is output to the personal computer 1 via the input-output cord 11.

Figure 3A:
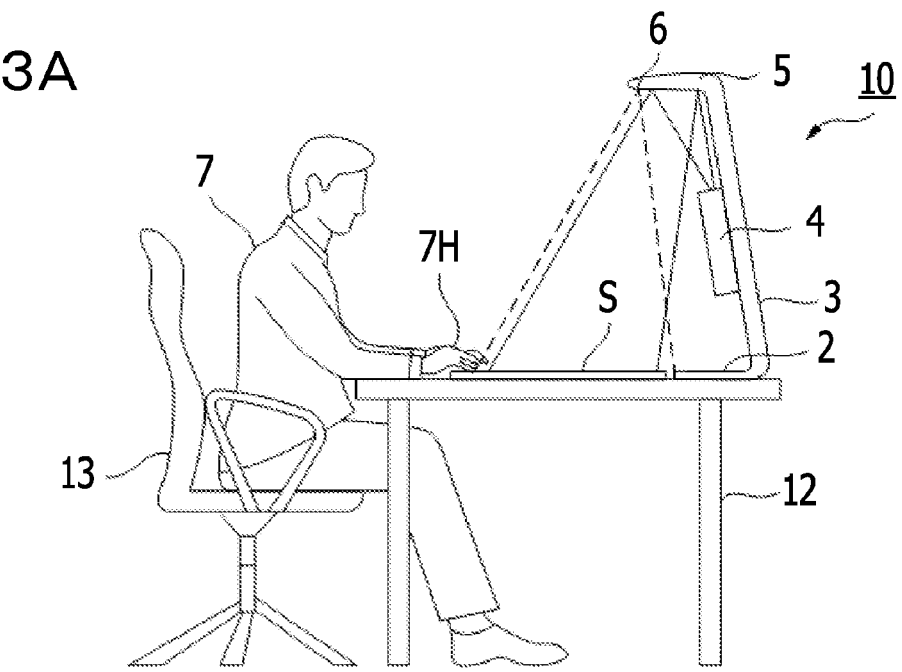
FIGS. 3A and 3B illustrate an example of a state in which an interactive projector is used on a desk.
Figure 3B:
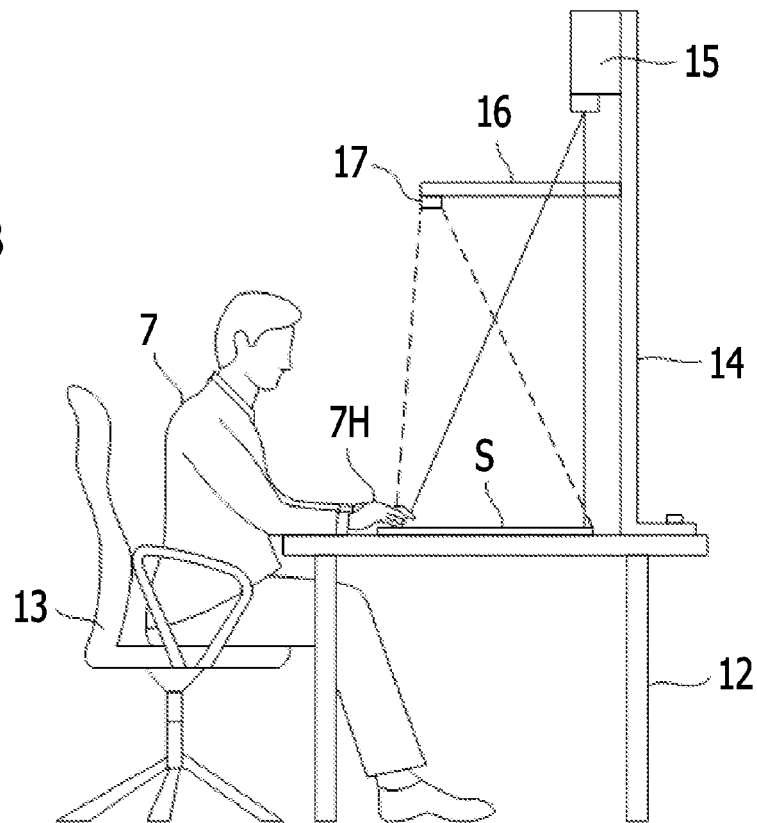

FIGS. 3A and 3B illustrate an example of a state in which an interactive projector is used on a desk. As illustrated in FIG. 1B, in the interactive projector 10, an image output from the personal computer 1 is projected from the projecting unit 4 towards the reflector 5, is reflected by the mirror 50, and is displayed on the projection surface P. For example, as illustrated in FIG. 3A, the interactive projector 10 is set on a table 12, and a screen S for clearly displaying an image is placed in the projection surface P.

An operator 7 sitting on a chair 13 exists in front of the table 12 on which the interactive projector 10 is set. The operator 7 touches an image displayed on the screen S by the interactive projector 10 by inserting a hand 7H into the displayed image, to perform an operation on the displayed image. The movement of the hand 7H of the operator 7 is photographed by the camera 6. An image that indicates which portion of the displayed image the hand 7H has touched or how the hand 7H has moved on the displayed image is output to a personal computer. Based on the image input from the camera 6, the personal computer determines what input operation is performed by the operator 7. An image formed by adding an image that is in accordance with the determined input operation to the original image, or a different image is input to the projecting unit 4, and is displayed on the screen S. As a result, the image is changed.

Above the screen S, the operator 7 inserts the hand 7H into the image changed by the interactive projector 10, and performs the next operation. The image on which the next operation is performed is displayed again by the interactive projector 10. The operator 7 may perform operations for changing the image any number of times. Since, the interactive projector 10 displays an image projected from the projecting unit 4 on the projection surface P by reflecting the image with the reflector 5, the device may be reduced in size as a result of an increase in a projection area.

In FIG. 3B, the above-described operation is performed using an existing product. A mounting support 14 is set on the table 12, a projecting unit 15 is set at an upper side, and an image is displayed on the screen S. A camera 17 is set at an end portion of an arm 16 provided orthogonal to the mounting support 14. Since the mounting support 14 is secured on the table 12, the arm 16 to which the camera 17 is mounted may get in the way. The projecting unit 15 is set at a high location, as a result of which space efficiency may be poor. For example, the interactive projector 10 that is compact is put away when not in use, so that the table 12 may also be used for other purposes.

Figure 2A:
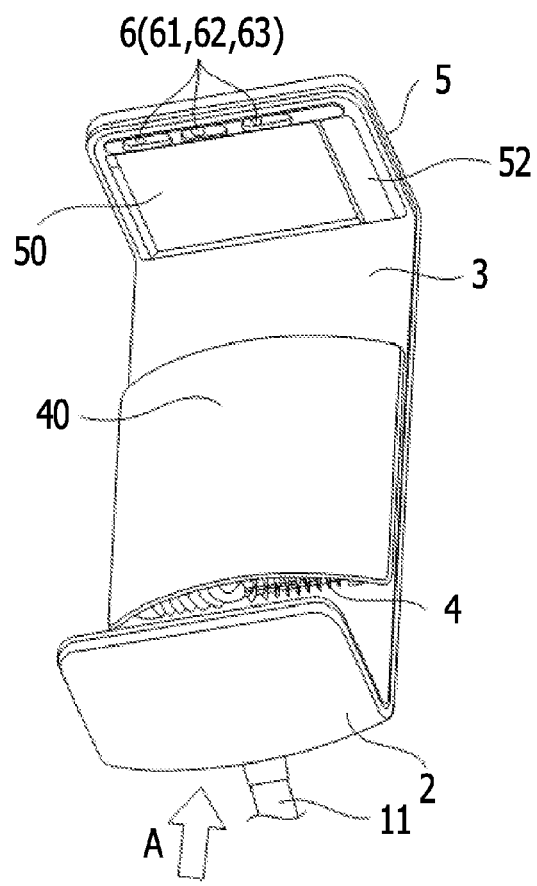
FIG. 2A is an example of a perspective view of an interactive projector seen from below.
Figure 2B:
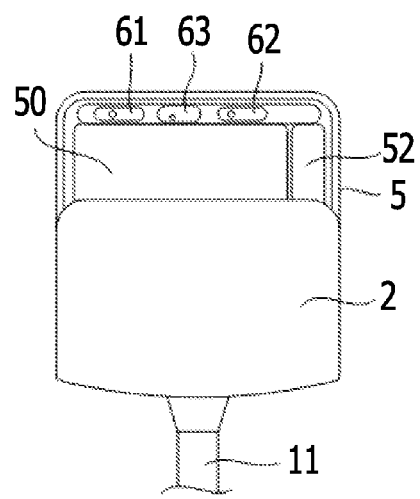
FIG. 2B is an example of a bottom view of an interactive projector when seen from a direction.
Figure 2C:
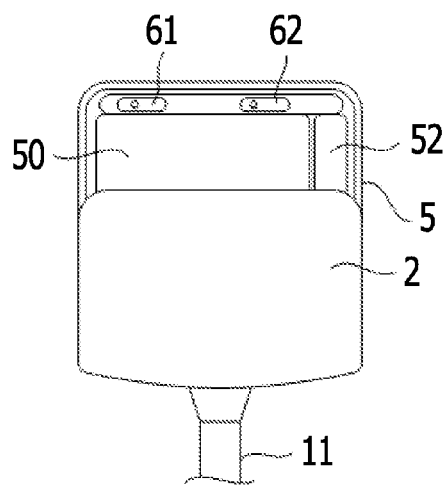
FIG. 2C is an example of a bottom view of an interactive projector.
Figure 2D:
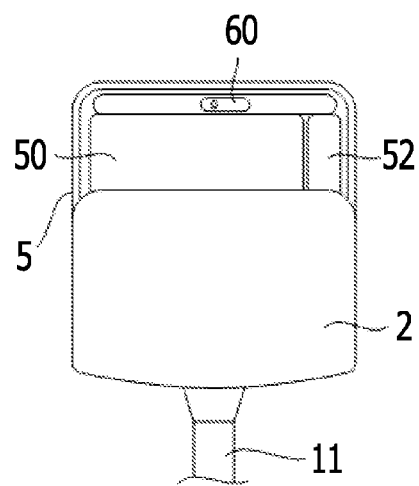
FIG. 2D is another example of a bottom view of an interactive projector.

FIG. 2A is an example of a perspective view of an interactive projector seen from below. FIG. 2B is an example of a bottom view of an interactive projector when seen from a direction. The direction may be arrow illustrated in Fig. A. FIG. 2C is an example of a bottom view of an interactive projector. FIG. 2D is an example of a bottom view of an interactive projector. The mirror 50 that reflects an image projected from the projecting unit 4 towards the projection surface P and a light source 52 that illuminates the projection surface P are provided on a projecting-unit-4 side of the reflector 5. In order for the camera 6 to photograph an item or printed matter placed on the projection surface P, the light source 52 illuminates the item or the printed matter.

The camera 6 is set in a space that is parallel to the projection surface P between the mirror 50 and a free-end-side edge of the reflector 5. The camera 6 may include two types of cameras, two first cameras 61 and 62 and one second camera 63. The first cameras 61 and 62 may be set apart from each other by a certain distance, and the second camera 63 may be set at a portion between the first cameras 61 and 62. When an image photographed by the first cameras 61 and 62 is output to a personal computer, the personal computer produces a composite three-dimensional image of a detection object inserted at the projection surface P, based on the parallax of the image photographed by the first cameras 61 and 62.

For example, in the state of use illustrated in FIG. 3A, since a three-dimensional image of the hand 7H of the operator 7 inserted at the screen S is obtained, the personal computer is capable of determining what operation is performed by the hand 7H with respect to a displayed image.

The resolution of the second camera 63 is higher than those of the first cameras 61 and 62. The second camera 63 reads an image displayed on the projection surface P with high resolution, and the personal computer analyzes the content of the displayed image. For example, the personal computer analyzes the content of the image displayed at a portion indicated by the hand of the operator, and causes an image corresponding to the analyzed image information to be sent to the projecting unit 4 and displayed. The camera 6 includes the first cameras 61 and 62 and the second camera 63 having high resolution. Therefore, the position indicated by a person's hand on the projection surface is calculated by cameras having resolutions that are not so high, and, for example, character information is precisely analyzed by a camera having high resolution.

When the camera 6 does not include the first cameras 61 and 62, and the second camera 63, for example, as illustrated in FIG. 2C, the first cameras 61 and 62 may be provided at the reflector 5. When a three-dimensional image is not to be detected, and only the position of a two-dimensional image on the projection surface P is to be detected, for example, as illustrated in FIG. 2D, only one camera 60 may be mounted on a central portion of the reflector 5.

Figure 4A:
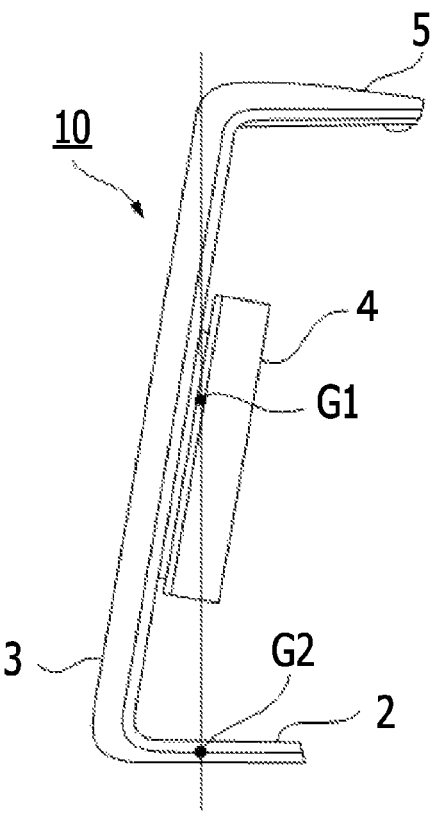
FIG. 4A illustrates an example of a position of a center of gravity of an interactive projector.
Figure 4B:
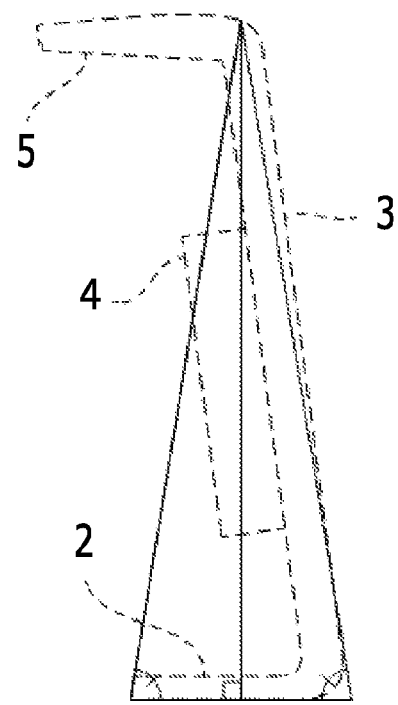
FIG. 4B illustrates an example of tilting of a leg of an interactive projector.

FIG. 4A illustrates an example of a position of a center of gravity of an interactive projector. FIG. 4B illustrates an example of tilting of a leg of an interactive projector. FIGS. 4A and 4B illustrate the tilt angle of the leg 3 with respect to the base 2. As illustrated in FIG. 4A, the center of gravity of a member including the leg 3, the projecting unit 4 mounted on the leg 3, and the reflector 5 provided at a free-end portion of the leg 3 is G1, and the center of gravity of the base 2 is G2. The tilt angle of the leg 3 with respect to the base 2 may be set so that the center of gravity G1 is positioned near the center of gravity G2 of the base 2. By setting low the mounting position of the projecting unit 4 with respect to the leg 3, the position of the center of gravity G1 becomes low, so that the setting may become stable.

For example, as illustrated in FIG. 4B, the entire length of the leg 3 and the length from a connection portion that couples the leg 3 and the reflector 5 to each other to an end portion of the base 2 at a side opposite to a connection end of the base 2 that is couples to the leg 3 may be set substantially equal to each other. The tilt angle of the leg 3 may be set so that the base 2 and the leg 3 form the base and leg of an isosceles triangle.

Figure 5:
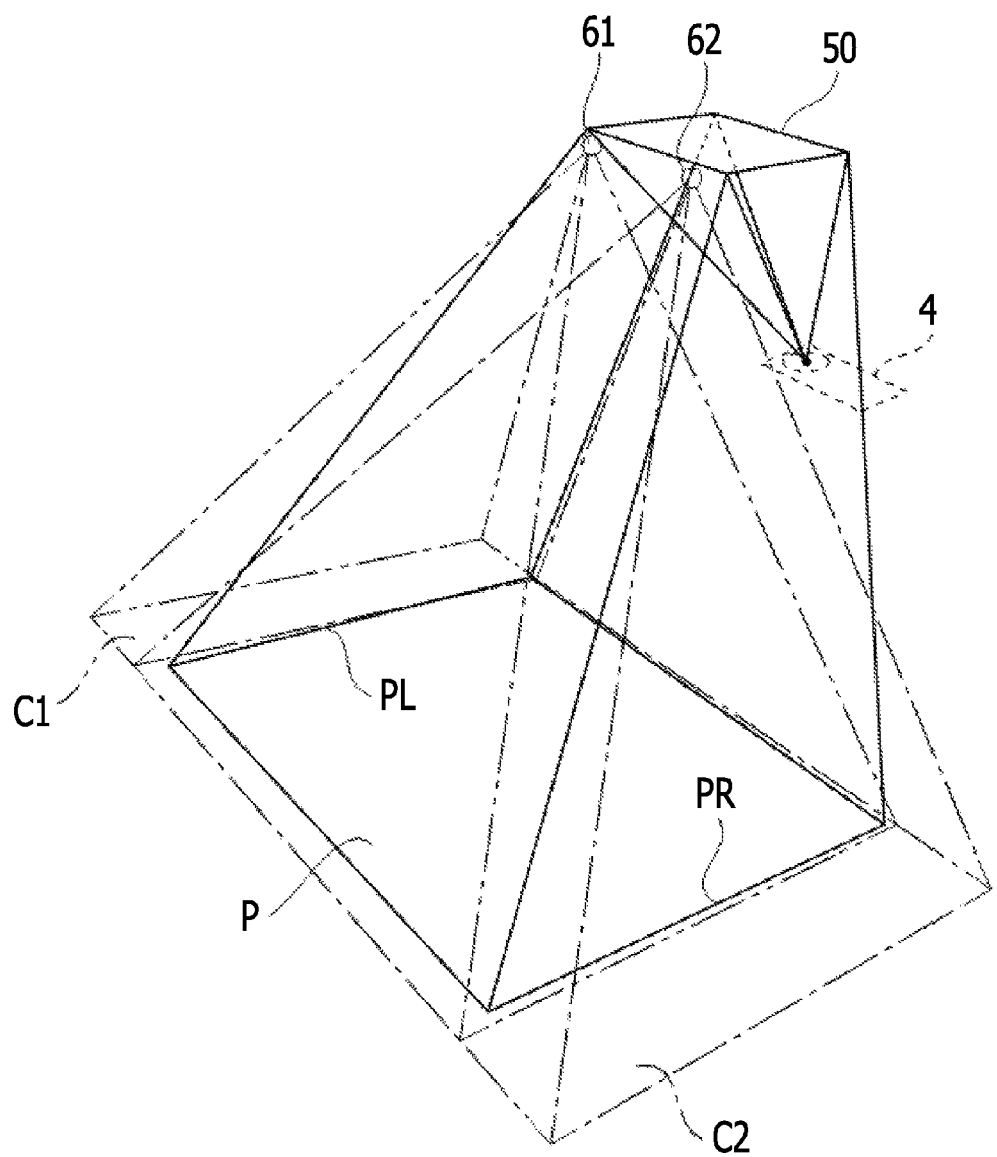
FIG. 5 illustrates an example of a light path from a projecting unit to a projection surface and an example of photographic ranges of two cameras.

FIG. 5 illustrates an example of a light path from a projecting unit to a projection surface and an example of photographic ranges of two cameras. FIG. 5 illustrates the light paths to the projection surface P from the projecting unit 4 illustrated in FIG. 2C and the photographic ranges of the two cameras 61 and 62. An image projected from the projecting unit 4 is reflected by the mirror 50 as illustrated by solid lines, and the image is displayed on the projection surface P. The photographic range of the camera 61 is a range C1 indicated by alternate long and two short dashes lines, and the camera 61 photographs a range that is slightly beyond a left end portion PL of the projection surface P. The photographic range of the camera 62 is a range C2 indicated by alternate long and short dash lines, and the camera 62 photographs a range that is slightly beyond a right end portion PR of the projection surface P. The photographic range C1 of the camera 61 and the photographic range C2 of the camera 62 include parallax.

Figure 6A:
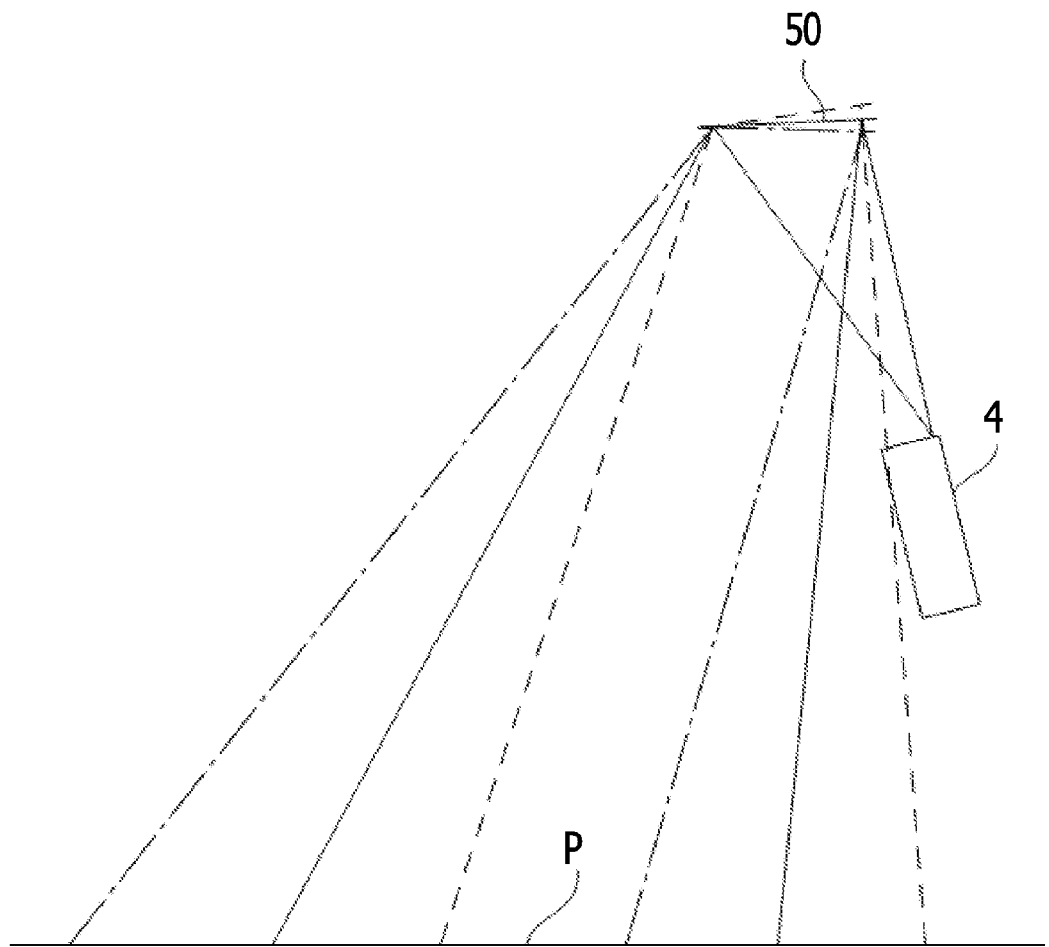
FIG. 6A illustrates an example of a change in a display range of an image on the projection surface.
Figure 6B:
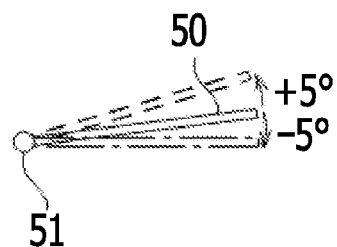
FIG. 6B illustrates an example of a fine adjustment mechanism of a mirror.

FIG. 6A illustrates an example of a change in a display range of an image on a projection surface. FIG. 6B illustrates an example of a fine adjustment mechanism of a mirror. FIG. 6A illustrates a change in the display range of an image that is displayed on the projection surface P when the angle of the mirror 50 at the reflector 5 is subjected to fine adjustment. For example, as illustrated in FIG. 6B, the fine adjustment mechanism 51 of the mirror 50 is provided at the mirror 50.

The fine adjustment mechanism 51 adjusts the angle of the mirror 50 in a range of, for example, −5 degrees to +5 degrees. A light path indicated by solid lines in FIG. 6A is a light path when the angle of the mirror 50 is not adjusted. A light path indicated by alternate long and short dash lines is a light path when the angle of the mirror 50 is adjusted to −5 degrees. A light path indicated by broken lines is a light path when the angle of the mirror 50 is adjusted to +5 degrees. The angle of the mirror 50 may be adjusted once or a plurality of times after the completion of a product.

Figure 7A:
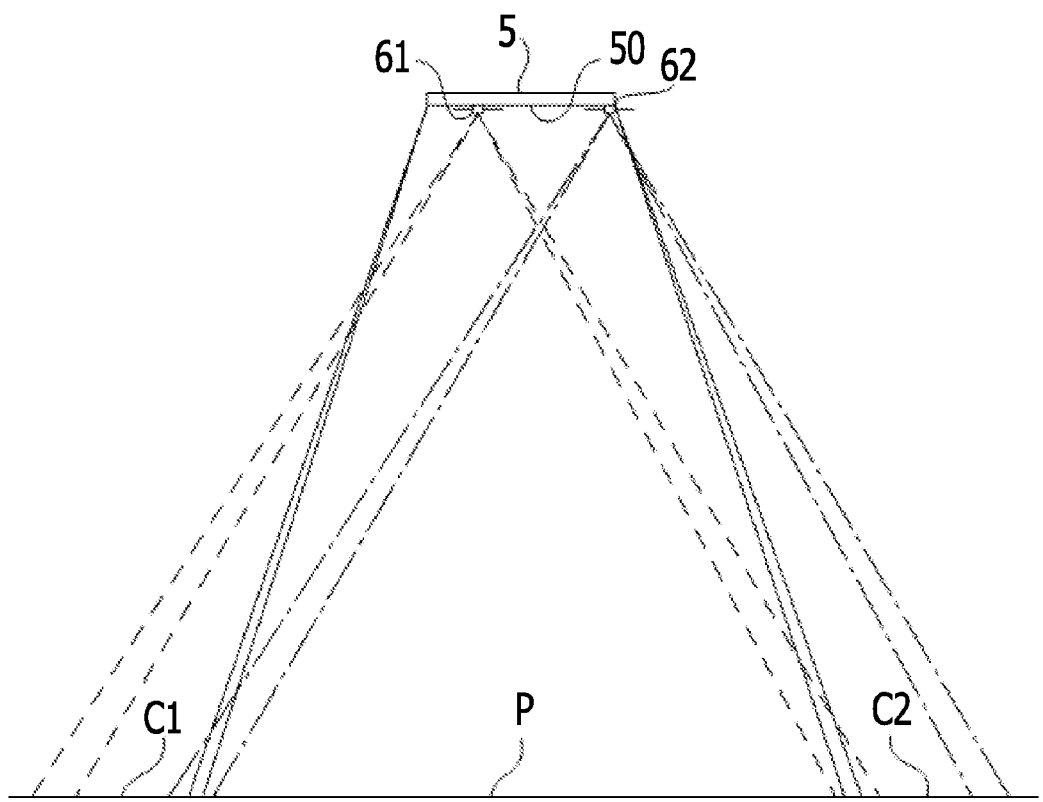
FIG. 7A illustrates an example of a change in a display range of an image on a projection surface and a change in a photographic range of a camera on a projection surface.
Figure 7B:
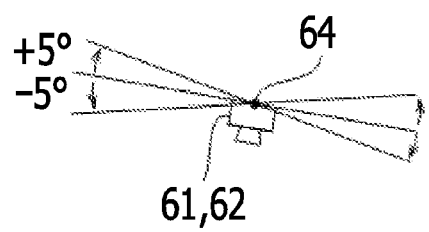
FIG. 7B illustrates an example of a fine adjustment mechanism of a camera.

FIG. 7A illustrates an example of a change in a display range of an image on a projection surface and a change in a photographic range of a cameras on a projection surface. FIG. 7B illustrates an example of a fine adjustment mechanism of a camera. FIG. 7A illustrates a change in the display range of an image on the projection surface P due to mounting tolerance of the mirror 50 provided at the reflector 5, and changes in the photographic ranges of cameras 61 and 62 on the projection surface P when the angles of the corresponding cameras 61 and 62 are subjected to fine adjustment. The mounting tolerance of the mirror 50 with respect to the reflector 5 causes the display range of the image on the projection surface P to change as indicated by solid lines. Therefore, in order to be capable of dealing with the case in which the display range of the image on the projection surface P changes as indicated by the solid lines, as illustrated in FIG. 7B, the angle of a photographic axis of each of the cameras 61 and 62 is set so as to be adjustable in the range of from −5 degrees to +5 degrees. Broken lines in FIG. 7A indicate a photographic fine adjustment range of the camera 61. Alternate long and short dash lines indicate a photographic fine adjustment range of the camera 62.

Figure 8:
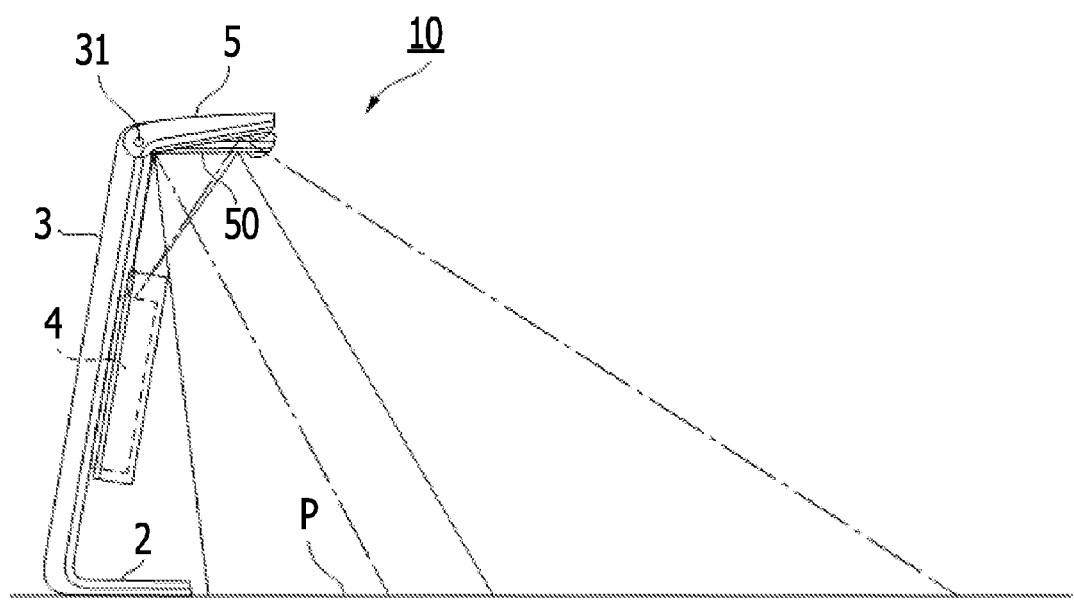
FIG. 8 illustrates an example of a change in a display range of an image on a projection surface.

FIG. 8 illustrates an example of a change in a display range of an image on a projection surface. FIG. 8 illustrates the interactive projector 10 in which the reflector 5 is set at the leg 3 so as to be made rotatable with respect to the leg 3 by a rotary mechanism 31. The rotary mechanism 31 rotates the reflector 5 upward. When the angle of the reflector 5 with respect to the leg 3 is considerably changed, the display range of the image on the projection surface P widens from the range indicated by solid lines to the range indicated by alternate long and short dash lines, so that the displayed image is enlarged.

Figure 9A:
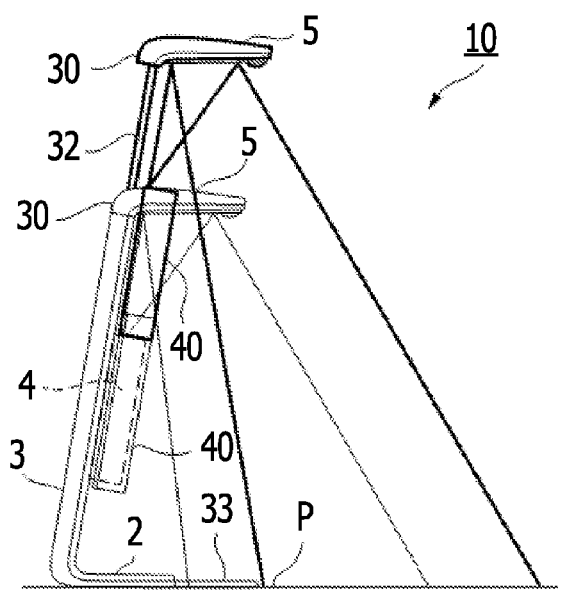
FIG. 9A illustrates an example of a state in which a reflector is separated from a leg and moved upward.
Figure 9B:
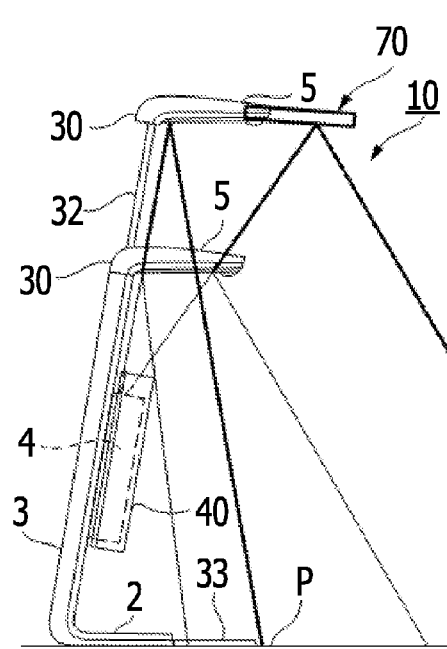
FIG. 9B illustrates an example of a state in which a reflector with a mirror attachment is separated from a leg and moved upward.
Figure 9C:
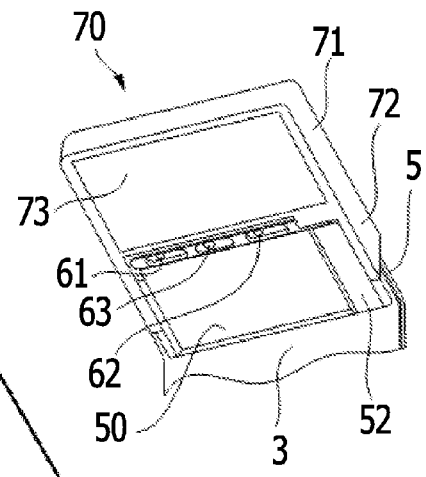
FIG. 9C illustrates an example of a reflector with a mirror attachment.

FIG. 9A illustrates an example of a state in which a reflector is separated from a leg and moved upward. In FIG. 9A, the projecting unit 4 also moved upward. FIG. 9B illustrates an example of a state in which a reflector with a mirror attachment is separated from a leg and moved upward. In FIG. 9B, the mirror attachment is mounted on the reflector 5. FIG. 9C illustrates an example of a reflector with a mirror attachment. FIG. 9A illustrates the interactive projector 10 in which the reflector 5 and the projector 4 are movable upward with respect to the leg 3. A movable portion at the leg 3 may be an upper portion 30 at an upper side of the projecting unit 4. An extendable rod 32 protrudes from a lower end of the upper portion 30 that is a separate portion. Ordinarily, the extendable rod 32 exists in the leg 3. By drawing out the extendable rod 32 from the leg 3, the reflector 5 moves upward with respect to the leg 3. The projecting unit 4 may move upward along a groove provided in the leg 3. When the relationship between the positions of the reflector 5 and the projecting unit 4 that have moved upward is substantially the same as that before the movement, an image from the projecting unit 4 reflected by the reflector 5 is enlarged and displayed on the projection surface P.

If the reflector 5 and the projecting unit 4 move upward with respect to the leg 3, the interactive projector 10 may tend to fall as a result of the center of gravity of the interactive projector 10 moving upward and out of alignment with the center of gravity of the base. Therefore, a rack and pinion mechanism is provided on both sides of the extendable rod 32 in the leg 3. The upward movement of the extendable rod 32 causes the rack to move downward. The rack and stays 33 built in the base 2 are coupled to each other by a flexible member, and the downward movement of the rack causes the stays 33 to protrude forwardly from the base 2. When two stays 33 built in the base 2 are formed so as to protrude obliquely and forwardly from the base 2, even if the reflector 5 and the projecting unit 4 move upward with respect to the leg 3, it may be unlikely for the interactive projector 10 to fall.

FIG. 9B illustrates the interactive projector 10 in which the reflector 5 is movable upward with respect to the leg 3, and the position of the projector 4 is fixed. When only the reflector 5 moves upward with respect to the leg 3, the size of the mirror of the reflector 5 may become large. Therefore, a mirror attachment 70 may be mounted on the reflector 5. The mirror attachment 70 may have a structure such as that illustrated in FIG. 9C. An additional mirror 73 is mounted on a lower surface of a case 71. By a mounting leg 72, provided on a side surface of the case 71, the mirror attachment 70 is mounted on a side surface of the reflector 5. At this time, the case 71 is provided so as not to cover the light source 52 and the cameras 61 to 63 provided at the reflector 5.

The mirror attachment 70 is mounted on the reflector 5. Therefore, as illustrated in FIG. 9B, even if the position of the projecting unit 4 remains fixed, the reflector 5 moves upward with respect to the leg 3 and an image from the projecting unit 4 is reflected by the reflector 5, is enlarged, and is displayed on the projection surface P. As illustrated in FIG. 9B, the reflector 5 moves upward with respect to the leg 3 as a result of protrusion of the stays 33 forwardly from the base 2. Therefore, even if the mirror attachment 70 is mounted on the reflector 5, it may be unlikely for the interactive projector 10 to fall.

Figure 10:
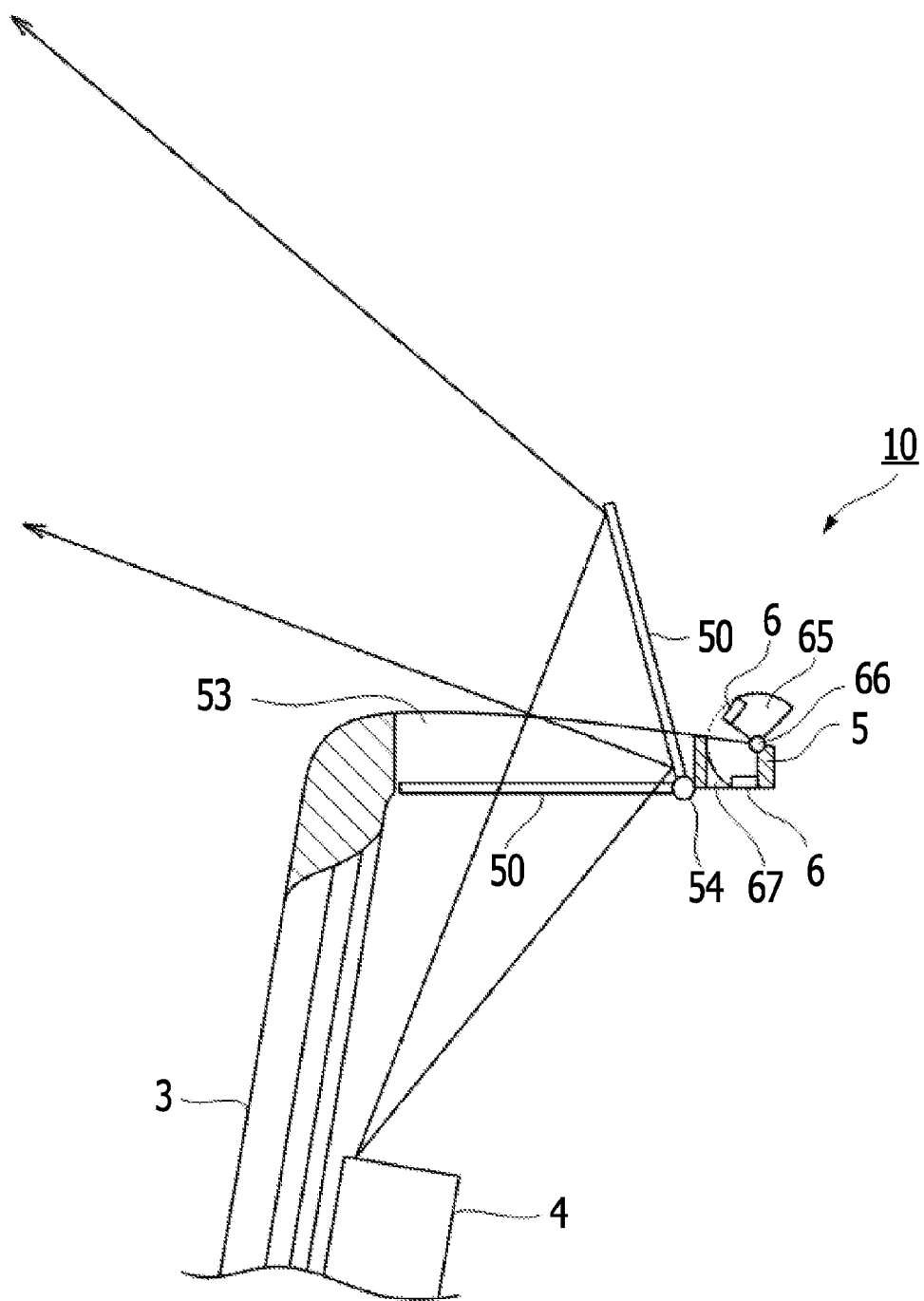
FIG. 10 illustrates an example of a state in which a mirror is rotated.

FIG. 10 illustrates an example of a state in which a mirror is rotated. In FIG. 10, an image from the projecting unit 4 is reflected in a wall direction, and the image projected onto a wall is capable of being photographed by the camera 6. FIG. 10 illustrates the interactive projector 10 in which the angle of the mirror 50, provided at the reflector 5, is capable of being considerably changed. A rotary mechanism 54, provided in a through hole 53 formed in the reflector 5, rotates the mirror 50 upward. Ordinarily, the mirror 50 is disposed at a bottom surface of the reflector 5. When an image from the projecting unit 4 is to be projected onto a wall, the rotary mechanism 54 causes the mirror 50 to rotate so as to protrude upward from the through hole 53. When the mirror 50 is rotated so as to protrude upward from the through hole 53, the image from the projecting unit 4 is reflected in a wall direction and is displayed on the wall.

At this time, the camera 6, provided at the reflector 5, may also rotate. For example, the camera 6 may be mounted on a rotary member 65 that is rotated by a camera rotary mechanism 66 and that is mounted in a camera mount hole 67 formed in an end portion of the reflector 5. Ordinarily, the rotary member 65 is accommodated in the camera mount hole 67, and the camera 6 photographs the projection surface at a table. When the mirror 50 is rotated upward from the through hole 53, and an image from the projecting unit 4 travels towards a wall, the camera rotary mechanism 66 causes the rotary member 65 to rotate, and the camera 6 to be set so as to face the wall.

Figure 11A:
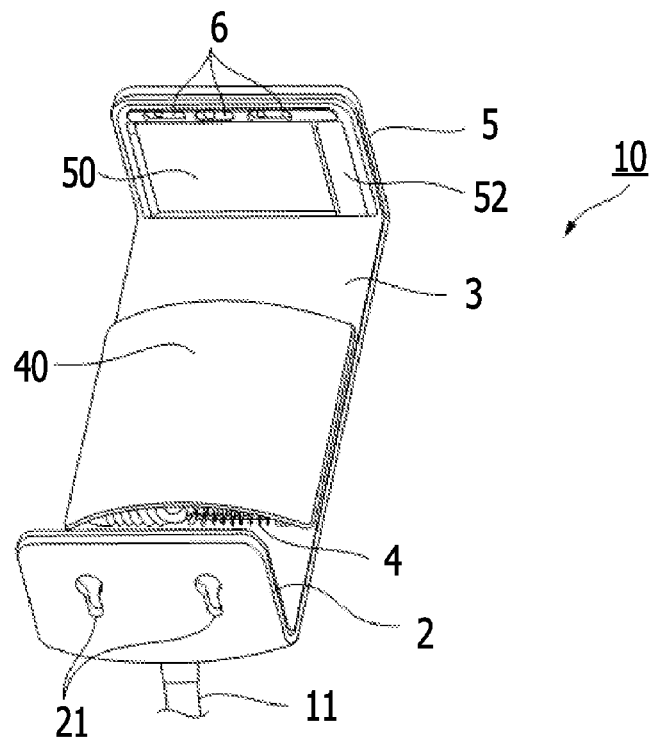
FIG. 11A illustrates an example of a perspective view of an interactive projector seen from a bottom surface.
Figure 11B:
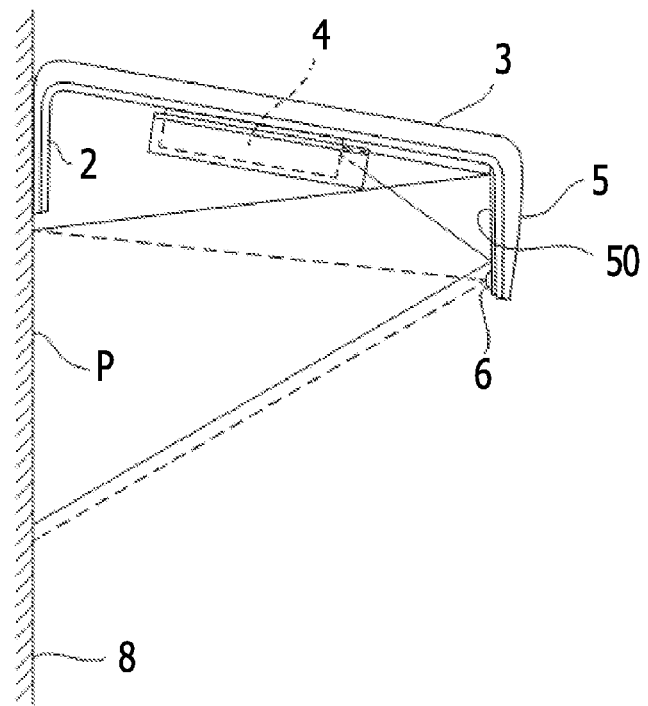
FIG. 11B illustrates an example of a state in which an interactive projector is mounted on a wall.

FIG. 11A illustrates an example of a perspective view of an interactive projector seen from a bottom surface. FIG. 11B illustrates an example of a state in which an interactive projector is mounted on a wall. FIG. 11A is a bottom view of the interactive projector 10 in which mount holes 21, used for hanging the interactive projector 10 on a wall, are formed in a back side of the base 2. The mount holes 21, used for hanging the interactive projector 10 on a wall and formed in the back side of the base 2, are fitted onto hooks or screws provided on the wall. As illustrated in FIG. 11B, the interactive projector 10 is mounted on a wall surface 8, and the projection surface P is formed at the wall surface 8.

Figure 12:
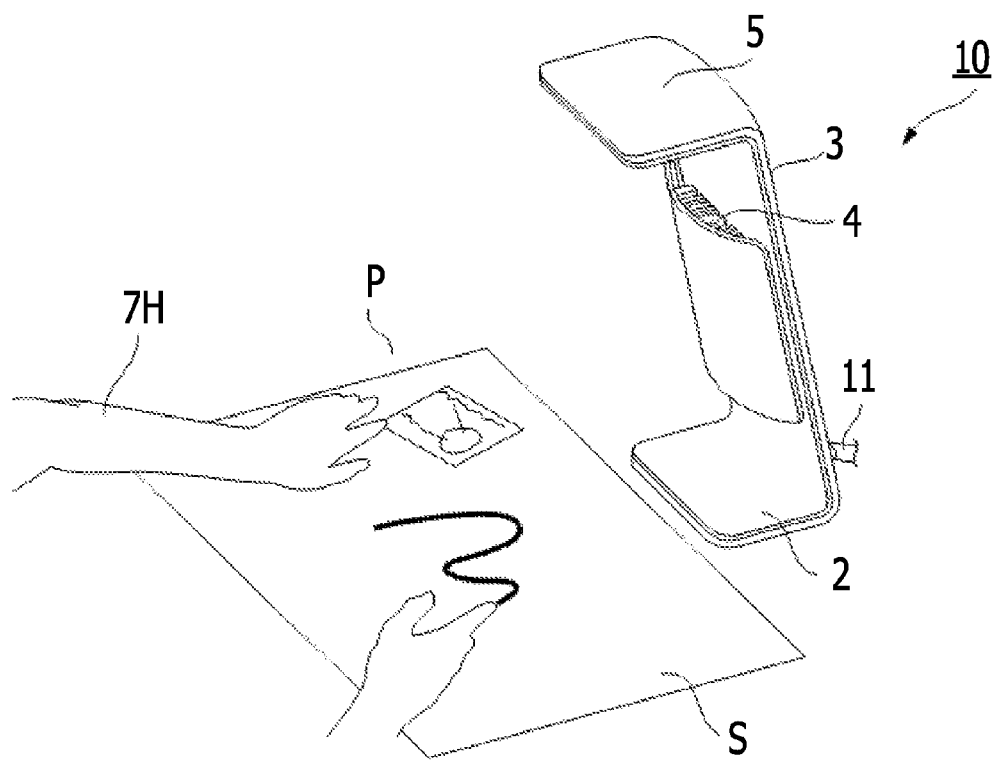
FIG. 12 illustrates an example of use of an interactive projector.
Figure 13:
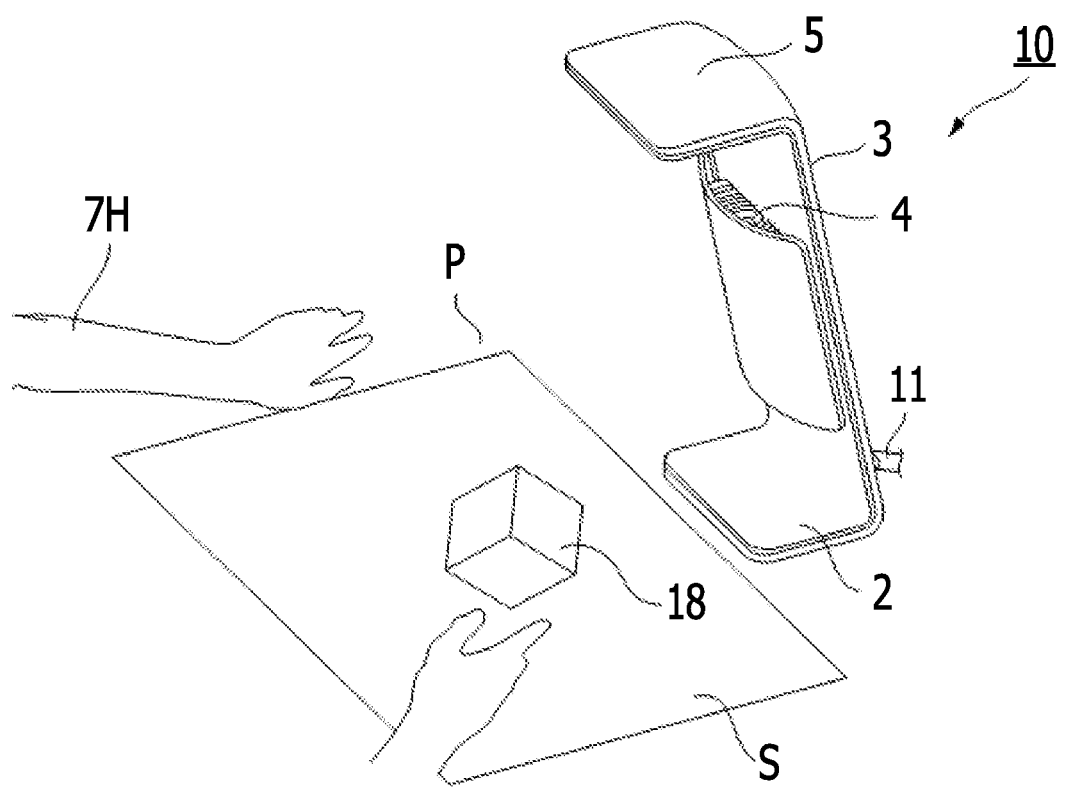
FIG. 13 illustrates an example of use of an interactive projector.
Figure 14:
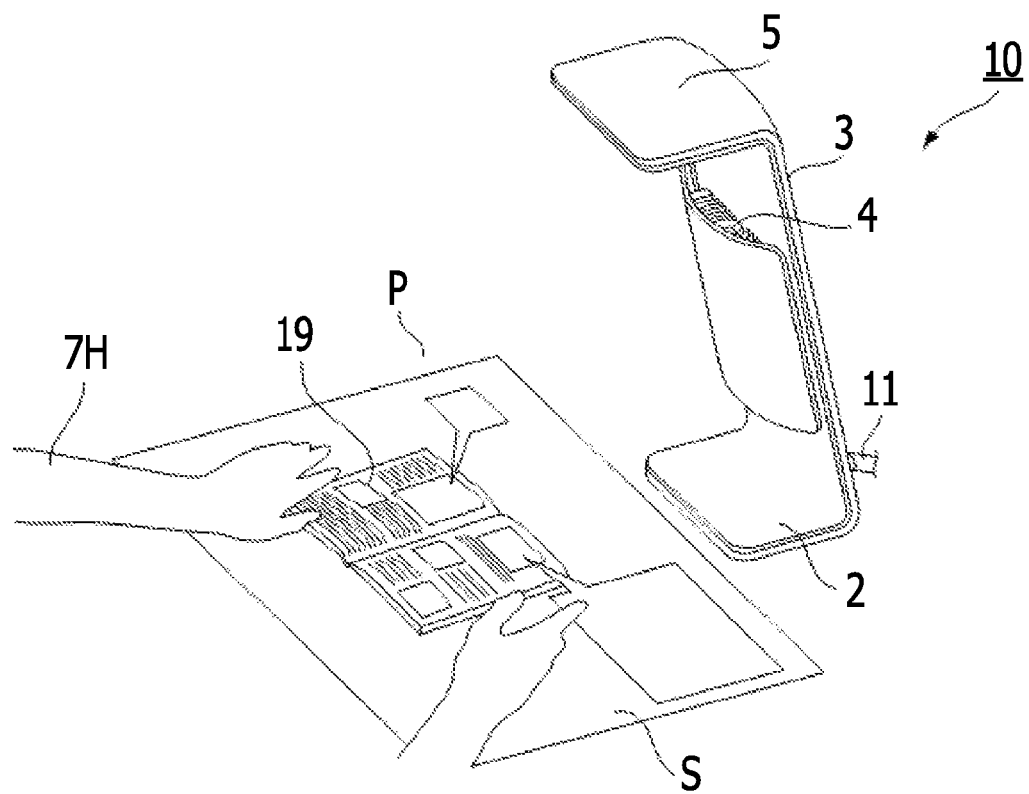
FIG. 14 illustrates an example of use of an interactive projector.

FIGS. 12, 13, and 14 each illustrate an example of use of an interactive projector. FIGS. 12, 13, and 14 each illustrate an example of use of the interactive projector 10. As illustrated in FIG. 12, when a figure is drawn by the hand 7H on a projected image on the screen S that has been set at the projection surface P, the figure is drawn on the image on the screen.

As illustrated in FIG. 13, when a three-dimensional object 18 is disposed on the screen S that has been set at the projection surface P, the three-dimensional object 18 is photographed, and an image thereof is superimposed upon an image on the screen S and is displayed. Thereafter, the three-dimensional object 18 may be removed from the screen S. By disposing various three-dimensional objects on the screen S, a composite image is formed.

In FIG. 14, when printed matter, such as a book 19, is disposed on the screen S that has been set at the projection surface P, characters in the book 19 are photographed and analyzed. Explanation images and fine images at a portion indicated by the hand 7H are projected onto portions of the screen S at the outer side of the book 19. For example, while turning the pages of the book 19, the entire content of the book 19 may be left in the form of images.

The examples of use of the interactive projector 10 are not limited to those illustrated from FIGS. 12 to 14, so that the interactive projector 10 may also be used for other purposes. In the interactive projector 10 according to the present application, an operation that is performed from the outside on a displayed image may be reflected in the displayed image, and the operation may be repeatedly reflected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An interactive projector comprising:
   a base placed on a projection surface;
   a leg configured to be connected with the base at a first connection portion on the projection surface;
   a projecting unit, mounted on the leg on the side of a projection surface, configured to project first image;
   a reflector, provided at a free-end portion of the leg, configured to reflect the image projected from the projecting unit towards the projection surface; and an image pickup unit, mounted on the reflector, configured to photograph the projection surface and output second image to an electronic device that outputs, to the projecting unit, the first image that is generated based on the second image, wherein the leg has an acute angle with the base and the projection surface so that the leg leans toward the base and the projection surface, and an end portion of the reflector on the opposite side to the lea is positioned farther from the first connection portion in a leaning direction than an end portion of the base on the opposite side to the leg.

2. The interactive projector according to claim 1, wherein a tilt angle of the leg is set so that a center of gravity of a member including the leg, the projecting unit, and the reflector is positioned close to a center of gravity of the base.

3. The interactive projector according to claim 1, wherein an entire length of the leg is substantially the same as a length from a second connection portion between the leg and the reflector to an end portion of the base, and wherein a tilt angle of the leg is set so that the base and the leg form a base and an oblique side of an isosceles triangle.

4. The interactive projector according to claim 1, wherein the image pickup unit includes at least two first image pickups that are disposed apart from each other by a gap and that are disposed parallel to the projection surface, and wherein the electronic device produces a composite three-dimensional image of a detection object inserted at the projection surface based on parallax of images input from the at least two image pickups.

5. The interactive projector according to claim 4, wherein the image pickup unit includes a second image pickup that has a resolution that is higher than those of the first image pickups, and wherein the electronic device detects a position on the projection surface indicated by a hand based on third images from the first image pickups, acquiring image information of the projection surface at a detected position based on fourth image from the second image pickup, and outputs fifth image corresponding to the image information as the second image to the projecting unit.

6. The interactive projector according to claim 1, wherein a detection object includes a hand of an operator, and wherein, based on a movement of the hand of the operator, the electronic device detects an operation on the projection surface and generates the second image.

7. The interactive projector according to claim 1, further comprising:

a mirror, provided at the reflector, configured to reflect the image projected from the projecting unit and include a fine adjustment mechanism configured to adjust a reflection angle.

8. The interactive projector according to claim 7, wherein the mirror, being rotatable outwardly with respect to the reflector, is configured to project the image from the projecting unit to a plane that is perpendicular to the projection surface.

9. The interactive projector according to claim 1, wherein the image pickup unit includes a camera including an adjustment mechanism that adjusts a photographic angle.

10. The interactive projector according to claim 1, further comprising:

a light source, provided on a lower surface of the reflector, configured to illuminate an object placed on the projection surface.

11. The interactive projector according to claim 1, further comprising:

a rotary mechanism provided at a connection portion between the reflector and the leg.

12. The interactive projector according to claim 1, further comprising:

an extendable rod, provided at a portion at an upper side from a mounting portion of the leg on which the projecting unit is mounted.

13. The interactive projector according to claim 12, wherein the extendable rod is drawn out from the leg, for extending the reflector.

14. The interactive projector according to claim 13, wherein, when the portion at the upper side from the mounting portion is extended with respect to the base, the projecting unit is also moved upward with respect to the leg.

15. The interactive projector according to claim 1, further comprising:

a mirror attachment mounted on the end portion of the reflector and including an additional mirror.

16. The interactive projector according to claim 1, further comprising:

a fall suppressing mechanism provided in the leg and the base and including a stay unit configured to protrude forwardly from the base when a portion of the leg at an upper side from a mounting portion of the leg on which the projecting unit is mounted is extended with respect to the base.

17. The interactive projector according to claim 16, wherein the fall suppressing mechanism includes:

a rack, provided on both sides of an extendable rod in the leg, configured to move in a opposite direction to a direction in which the extendable rod moves; and a flexible member whose one end is coupled to an lower end of the rack, wherein the stay unit includes two stays, coupled to another end of the flexible member, configured to move in and out of the base.

18. The interactive projector according to claim 17, wherein, when the extendable rod is accommodated in the leg, the stays are accommodated in the base, and wherein, when the extendable rod moves upward from inside the leg, the stays protrude forwardly from inside the base.

19. The interactive projector according to claim 1, wherein a bottom surface of the base is provided with a wall hanging mount hole for setting the base on a wall surface.

* * * * *